United States Patent
Saito

(10) Patent No.: US 12,248,717 B2
(45) Date of Patent: Mar. 11, 2025

(54) DEVICE, METHOD, AND NON-TRANSITORY COMPUTER-READABLE RECORDING MEDIUM WITH COMPUTER PROGRAM FOR MANAGING MACHINE TROUBLES, AND IMAGE FORMING SYSTEM WITH MACHINE TROUBLE MANAGEMENT DEVICE

(71) Applicant: KONICA MINOLTA, INC., Tokyo (JP)

(72) Inventor: Shinya Saito, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 1 day.

(21) Appl. No.: 18/362,299

(22) Filed: Jul. 31, 2023

(65) Prior Publication Data
US 2024/0069827 A1 Feb. 29, 2024

(30) Foreign Application Priority Data
Aug. 25, 2022 (JP) .................. 2022-134442

(51) Int. Cl.
*G06F 3/12* (2006.01)
(52) U.S. Cl.
CPC ............ *G06F 3/1234* (2013.01); *G06F 3/121* (2013.01); *G06F 3/1204* (2013.01)
(58) Field of Classification Search
None
See application file for complete search history.

(56) References Cited

U.S. PATENT DOCUMENTS

| | | | | |
|---|---|---|---|---|
| 10,423,367 B1 * | 9/2019 | Yamamoto | ............ | G06F 3/1207 |
| 2015/0054865 A1 * | 2/2015 | Landa | .................. | G06F 3/1207 347/2 |
| 2018/0063366 A1 | 3/2018 | Mori et al. | | |
| 2019/0034130 A1 * | 1/2019 | Tajima | ................. | G06F 3/1207 |

FOREIGN PATENT DOCUMENTS

JP 2018037752 A 3/2018

* cited by examiner

*Primary Examiner* — Darryl V Dottin
(74) *Attorney, Agent, or Firm* — Buchanan Ingersoll & Rooney PC

(57) ABSTRACT

A management device for managing machine troubles includes a controller that: generates display information in which production timeline information of one or a plurality of jobs and information on errors of the one or a plurality of jobs are associated with each other; and outputs the display information. The production timeline information includes one or a plurality of pieces of production timeline information of the one or a plurality of jobs. The information on errors includes one or a plurality of pieces of error-related information each associated with a corresponding one of the one or a plurality of pieces of production timeline information. In the display information, the one or a plurality of pieces of production timeline information are arranged along one of a vertical axis and a horizontal axis and the one or a plurality of pieces of error-related information are arranged along the other axis.

20 Claims, 11 Drawing Sheets

☑ Machine designation display    Machine number ☐

| Machine 1 | Machine 2 | Machine 3 |

☐ Time designation display

☐☐ : ☐☐ ~ ☐☐ : ☐☐

☐ Production sheet count designation display

[Greater than or equal to ▼] ~ [Less than ▼]

☐ Per-Machine similar Job display

☐ Per-Worker similar Job display

☐ Per-Similar-Job machine production record display

[ Back ]          [ Execute ]

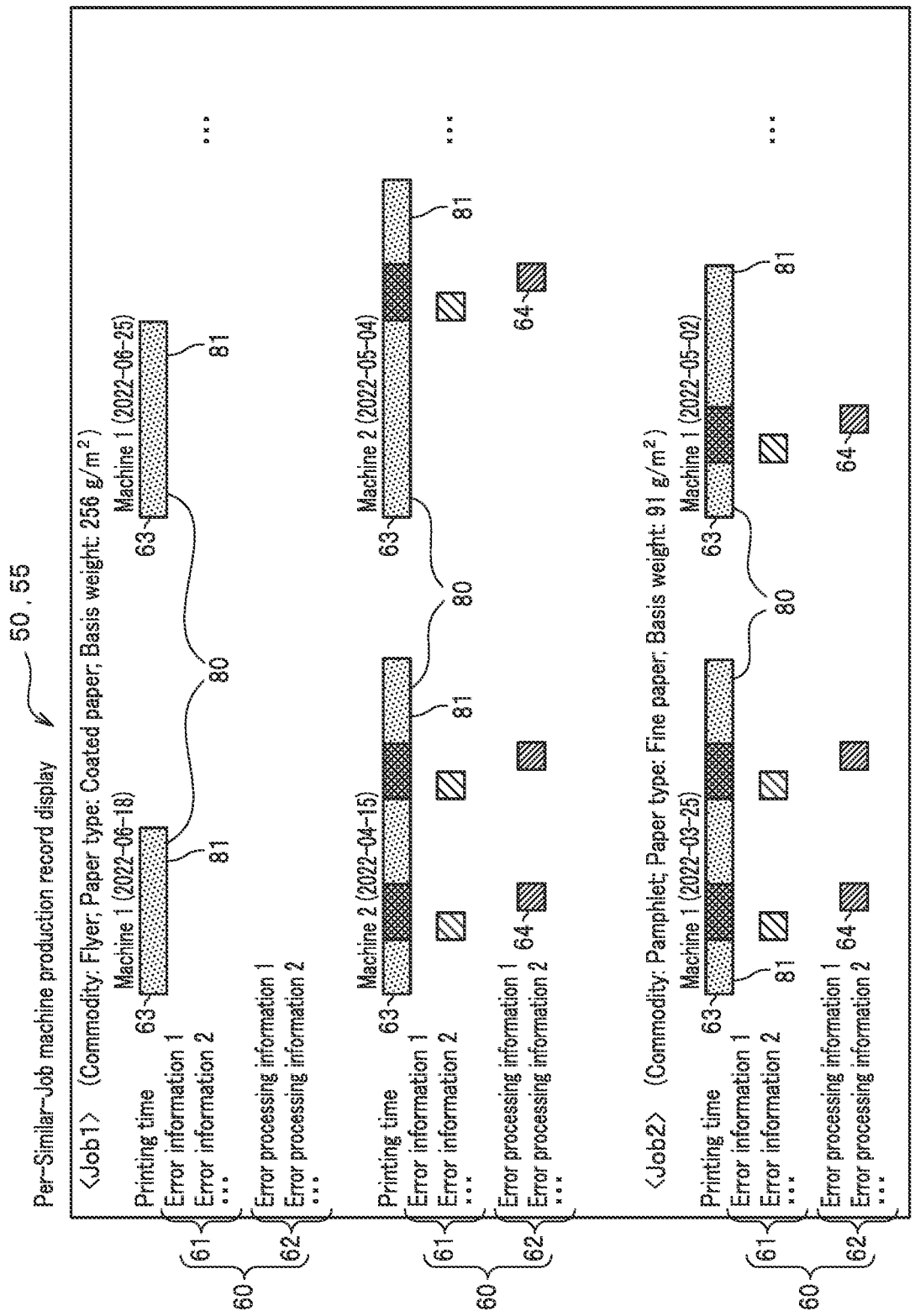

<Error detail information>

Name: Paper jam

Code: J-1600

Occurrence time: 15:25

Machine information: No. 2 (C10000)

Occurrence location: Sheet feed tray 1

Job information:
    Job name: Case xxx

Commodity: Flyer

Size: A4

Sheet: Fine paper

...

Work content: Wind adjustment

Work manual: http://xxxxx

DEVICE, METHOD, AND NON-TRANSITORY COMPUTER-READABLE RECORDING MEDIUM WITH COMPUTER PROGRAM FOR MANAGING MACHINE TROUBLES, AND IMAGE FORMING SYSTEM WITH MACHINE TROUBLE MANAGEMENT DEVICE

CROSS REFERENCE TO RELATED APPLICATIONS

This application claims foreign priority to Japanese Patent Application No. 2022-134442, filed Aug. 25, 2022, the disclosure of which is incorporated herein by reference.

BACKGROUND

Technological Field

The present invention relates to a machine trouble management device, a computer-readable recording medium storing machine trouble management program, a machine trouble management method, and an image forming system with a machine trouble management device.

Description of the Related Art

Conventionally, an image forming apparatus (printing machine) stores information representing machine states as log information. Based on the log information, it is possible to check when and what kind of trouble has occurred, how often the trouble has occurred, and the like. A manager of a printing company perform process improvement by analyzing log information on its own machine to investigate when and what kind of trouble occurs and by considering how to avoid the troubles and what operation rules should be applied to the entire process to improve the machine utilization rate and the like.

However, it takes time for the manager of the printing company to analyze what kind of error (trouble) has occurred in each job only from enumeration of numerical value information and/or character information like log information. Due to this, the manager of the printing company cannot take time for the consideration on the process improvement, and the process improvement is performed by a provisional measure, and the productivity may not be improved.

In this regard, for example, in the conventional technique disclosed in Patent Document 1, it has been proposed to display an icon in association with the job in a manner of corresponding to a malfunction that has occurred, to display the presence or absence of the occurrence of the malfunction occurring in printing in an easily understandable manner for a user.

Related Art Literature

Patent Document

Patent Document 1: Japanese Unexamined Patent Publication No. 2018-37752

SUMMARY

However, the conventional technique disclosed in Patent Document 1 does not take into account an event in which an error occurs almost periodically during the execution of a plurality of jobs. Due to this, there is a problem in that it is difficult to figure out a process in which an error frequently occurs continuously in association with the production timelines of the plurality of jobs, and it takes time to identify a process which is a bottleneck (obstacle) of job execution in association with the production timelines of the plurality of jobs.

The present invention has been made in consideration of the problems of the conventional technique described above, and an object of the present invention is to provide a machine trouble management device, a computer-readable recording medium storing machine trouble management program, a machine trouble management method, and an image forming system with a machine trouble management device, which facilitate identification of a process that is a bottleneck in job execution in association with production timelines of a plurality of jobs.

Solution to Problems

To achieve at least one of the above-mentioned objects, an aspect of the present invention is a management device for managing machine troubles, the management device including a controller implemented using one or more hardware processors, wherein the controller: generates display information in which production timeline information of one or a plurality of jobs and information on errors of the one or a plurality of jobs are associated with each other; and outputs the display information, wherein the production timeline information includes one or a plurality of pieces of production timeline information of the one or a plurality of jobs, wherein the information on errors includes one or a plurality of pieces of error-related information each associated with a corresponding one of the one or a plurality of pieces of production timeline information, and wherein in the display information, the one or a plurality of pieces of production timeline information are arranged along one of a vertical axis and a horizontal axis and the one or a plurality of pieces of error-related information are arranged along the other axis.

Another aspect of the present invention is a non-transitory computer-readable recording medium storing a computer program for a computer including one or more hardware processors, the program causing the computer to function as a machine trouble management device including: a controller implemented using one or more hardware processors, wherein the controller: generates display information including one or a plurality of pieces of production timeline information of one or a plurality of jobs as well as one or a plurality of pieces of error-related information, the one or a plurality of pieces of production timeline information arranged along one of a vertical axis and a horizontal axis, the one or a plurality of pieces of error-related information arranged along the other axis, and outputs the display information.

Yet another aspect of the present invention is a management method for managing machine troubles using a computer including one or more hardware processors, the method including steps of: generating, by one or more of the one or more hardware processors, display information including one or a plurality of pieces of production timeline information of one or a plurality of jobs as well as one or a plurality of pieces of error-related information, the one or a plurality of pieces of production timeline information arranged along one of a vertical axis and a horizontal axis, the one or a plurality of pieces of error-related information arranged along the other axis; and outputting, by one or more of the one or more hardware processors, the display information to outside.

Yet another aspect of the present invention is an image forming system including: one or a plurality of image forming apparatuses; and a management device implemented using one or more hardware processor to manage one or a plurality of machine troubles of the one or a plurality of image forming apparatuses, wherein the management device: generates display information in which production timeline information of one or a plurality of jobs and information on errors of the one or a plurality of jobs are associated with each other; and outputs the display information, wherein the production timeline information includes one or a plurality of pieces of production timeline information of the one or a plurality of jobs, wherein the information on errors includes one or a plurality of pieces of error-related information each associated with a corresponding one of the one or a plurality of pieces of production timeline information, and wherein in the display information, the one or a plurality of pieces of production timeline information are arranged along one of a vertical axis and a horizontal axis and the one or a plurality of pieces of error-related information are arranged along the other axis.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 is an explanatory diagram of an operation acceptance screen of the management device according to the embodiment.

FIG. 8 is an explanatory diagram of display information in a per-similar-job machine production record display mode;

FIG. 9B is an explanatory diagram of error detail information.

DETAILED DESCRIPTION OF EMBODIMENT

Figure 1:
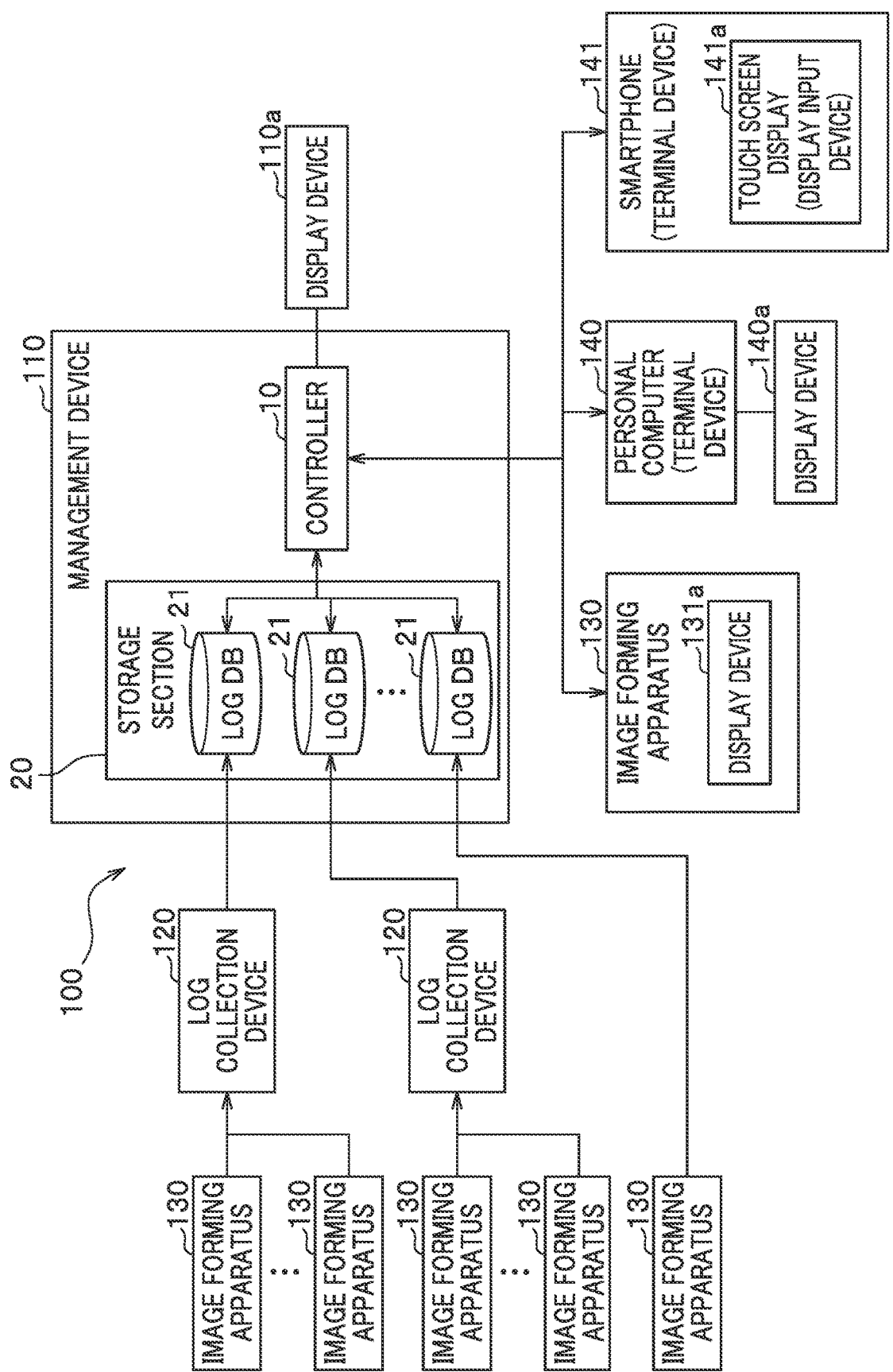
FIG. 1 is a configuration diagram of an image forming system including a management device according to an embodiment.

Hereinafter, one or more embodiments of the present invention will be described with reference to the drawings. However, the scope of the invention is not limited to the disclosed embodiments.

It should be noted that the drawings are merely schematic to the extent that the present invention can be fully understood. Therefore, the present invention is not limited to the examples illustrated in the drawings. Furthermore, in the respective drawings, common constituent elements and similar constituent elements are denoted by the same reference signs, and redundant description thereof is omitted.

Overview of Management Device

The management device 110 (see FIGS. 1 and 2) according to the embodiment of the present invention generates, for example, the display information 52, 53, 54, and 55 illustrated in FIGS. 5 to 8 and presents the display information to the user in order to facilitate identification of a process that is a bottleneck (obstacle) in the execution of a job in association with the production timelines of a plurality of jobs. The display information 52, 53, 54, and 55 illustrated in FIGS. 5 to 8 each includes: one or a plurality of pieces of production timeline information of one or a plurality of jobs arranged along one of the vertical axis and the horizontal axis; and one or a plurality of pieces of error-related information arranged along the other axis.

Configuration of Management Device

Figure 2:
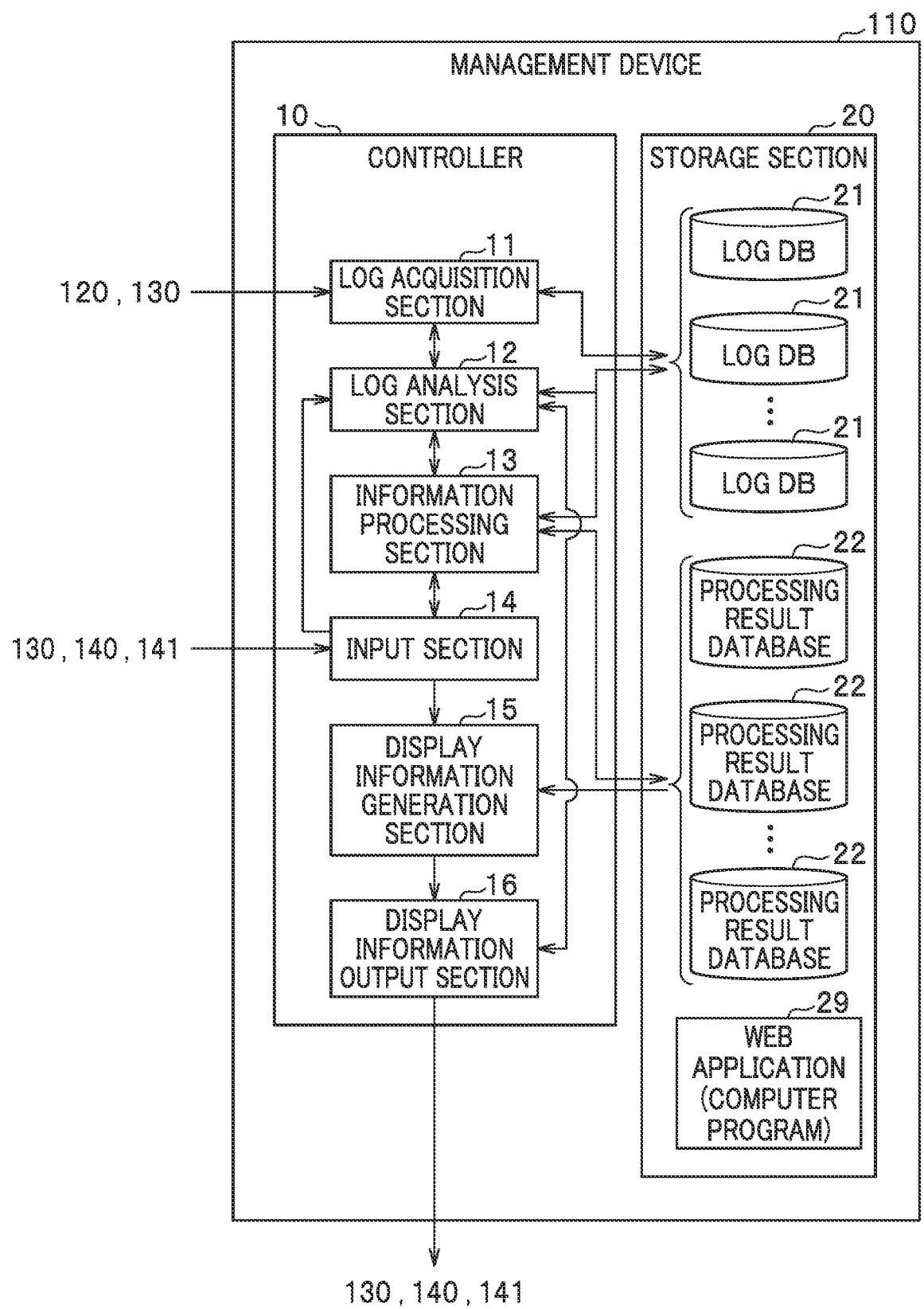
FIG. 2 is a configuration diagram of the management device according to the embodiment.

Hereinbelow, a description will be given of a configuration of the management device 110 according to the embodiment of the present invention with reference to FIGS. 1 and 2. FIG. 1 is a configuration diagram of an image forming system 100 including the management device 110 according to the present embodiment. FIG. 2 is a configuration diagram of the management device 110. Here, a description will be given of a case where the management device 110 is a device that monitors machine troubles of a plurality of image forming apparatuses 130 (printing machines). It should be noted that the management device 110 may be a device that monitors machine troubles of any apparatus other than the image forming apparatus 130. That is, the use of the management device 110 is not limited to monitoring in image formation. In the present embodiment, the image forming apparatus 130 may be referred to as a "machine". Note that a part of the image forming apparatus 130 (for example, a mechanism including units and functions) may be a "machine", and an image forming apparatus 130 may include a plurality of "machines".

Image forming system 100 is a system in which one or a plurality of image forming apparatuses 130 each form images. The image forming system 100 includes the management device 110. The management device 110 monitors machine troubles of the one or a plurality of image forming apparatuses 130.

In the example illustrated in FIG. 1, the image forming system 100 includes the management device 110, one or more (two in the illustrated example) log collection devices 120, and the plurality of image forming apparatuses 130. Note that, although the image forming system 100 illustrated in FIG. 1 includes the plurality of image forming apparatuses 130, the image forming system 100 may have only one image forming apparatus 130. The devices are communicably connected to each other via a network (not shown).

The management device 110 is a device that monitors machine troubles of monitoring targets (here, the image forming apparatuses 130).

The log collection devices 120 are each a device that collects information representing machine states from corresponding image forming apparatuses 130 as log information and outputs the log information to the management device 110.

The image forming apparatuses 130 are each an apparatus that forms images. Each of the image forming apparatuses 130 is, for example, a printing machine that prints images on a medium such as paper or cloth. The image forming apparatuses 130 are communicably connected to the management device 110 via the log collection devices 120 or directly.

The management device 110 includes a controller 10 and a storage section 20. The management device 110 is, for example, a server that is communicably connected to the image forming apparatuses 130. The management device 110 may be a cloud server deployed on a cloud. In the storage section 20, log databases 21 are constructed in which log information (information representing machine states) of the image forming apparatuses 130 is stored. Hereinafter, a "database" may be referred to as a "DB". The management device 110 generates, for example, the display information 52, 53, 54, 55 illustrated in FIGS. 5 to 8 based on the log information and the like of the image forming apparatus 130, and causes a display device to display the display information. For example, the management device 110 may display the display information 52, 53, 54, 55 on a display device 110a connected to the management device 110. Alternatively, the management device 110 may cause the image forming apparatuses 130 to display them on a display device 131a included in each of the image forming apparatuses 130. Alternatively, the management device 110 may cause the personal computer 140 to display them on a display device 140a included in the personal computer 140. Alternatively, the management device 110 may cause the smartphone 141 to display them on a touch screen display 141a included in the smartphone 141. The personal computer 140 and the smartphone 141 are terminal devices carried by a user. As the terminal device, a tablet terminal may be used instead of the smartphone 141.

As illustrated in FIG. 2, the controller 10 of the management device 110 includes a log acquisition section 11, a log analysis section 12, an information processing section 13, an input section 14, a display information generation section 15, and a display information output section 16. These are, for example, embodied by a CPU (Central Processing Unit) executing a web application 29 (computer program) stored in advance in a read only memory (ROM) constituting a part of the storage section 20.

The log acquisition section 11 acquires log information (information representing machine states) of each image forming apparatus 130 from the image forming apparatus 130 via the corresponding log collection device 120 or directly and stores the log information in the log database 21.

The log analysis section 12 analyzes the log information of each image forming apparatus 130.

The information processing section 13 identifies the machine states based on log information or the like of the image forming apparatuses 130. The information processing section 13 generates, for each machine or each worker, display source information (not illustrated) which is, for example, a source of the display information 52, 53, 54, and 55 illustrated in FIGS. 5 to 8. Here, the display source information as a source of the display information 52, 53, 54, and 55 means information from which it is possible to obtain the display information 52, 53, 54, and 55, illustrated in FIGS. 5 to 8, by extracting, processing, editing, or combining parts of the display source information.

The input section 14 receives various kinds of information and instructions.

The display information generation section 15 generates, for example, the display information 52, 53, 54, and 55 illustrated in FIGS. 5 to 8.

The display information output section 16 outputs the display information 52, 53, 54, 55 (see FIGS. 5 to 8) generated by the display information generation section 15 to the outside.

In the storage section 20, log databases 21 and processing result databases 22 are constructed. The web application 29 is stored in the storage section 20 in advance.

The log databases 21 store log information (information representing machine states) of the image forming apparatuses 130.

The processing result databases 22 store calculation processing results by the information processing section 13. The calculation processing results by the information processing section 13 include, for example, display source information (not illustrated) serving as a source of the display information 52, 53, 54, and 55 illustrated in FIGS. 5 to 8.

The web application 29 is a computer program for causing a computer to function as the management device 110. The web application 29 may be stored in a not-illustrated storage medium and may be directly installed on the computer from the storage medium or indirectly installed on the computer from the storage medium via a not-illustrated network.

In this configuration, the image forming system 100 transmits log information representing the machine states of each image forming apparatus 130 from the image forming apparatus 130 to the management device 110 functioning as a server on the cloud via the corresponding log collection device 120 or directly. Then, the image forming system 100 stores the transmitted log information in the log database 21 of the management device 110. The management device 110 generates, for example, display information 52, 53, 54, 55 illustrated in FIGS. 5 to 8 by the web application 29 based on the stored log information according to the operation of the user, and displays the display information on the display device of the image forming apparatus 130 or a terminal device (personal computer 140, smartphone 141, or the like) (or on a display device connected to the management device 110). For example, as illustrated in FIGS. 5 to 8, the display information 52, 53, 54, and 55 are each presented such that error information 61 representing errors and temporal information related to error processing information 62 representing processing for resolving the errors are displayed along the below-described production timeline 81 with different colors.

Operation of Management Device

Figure 3:
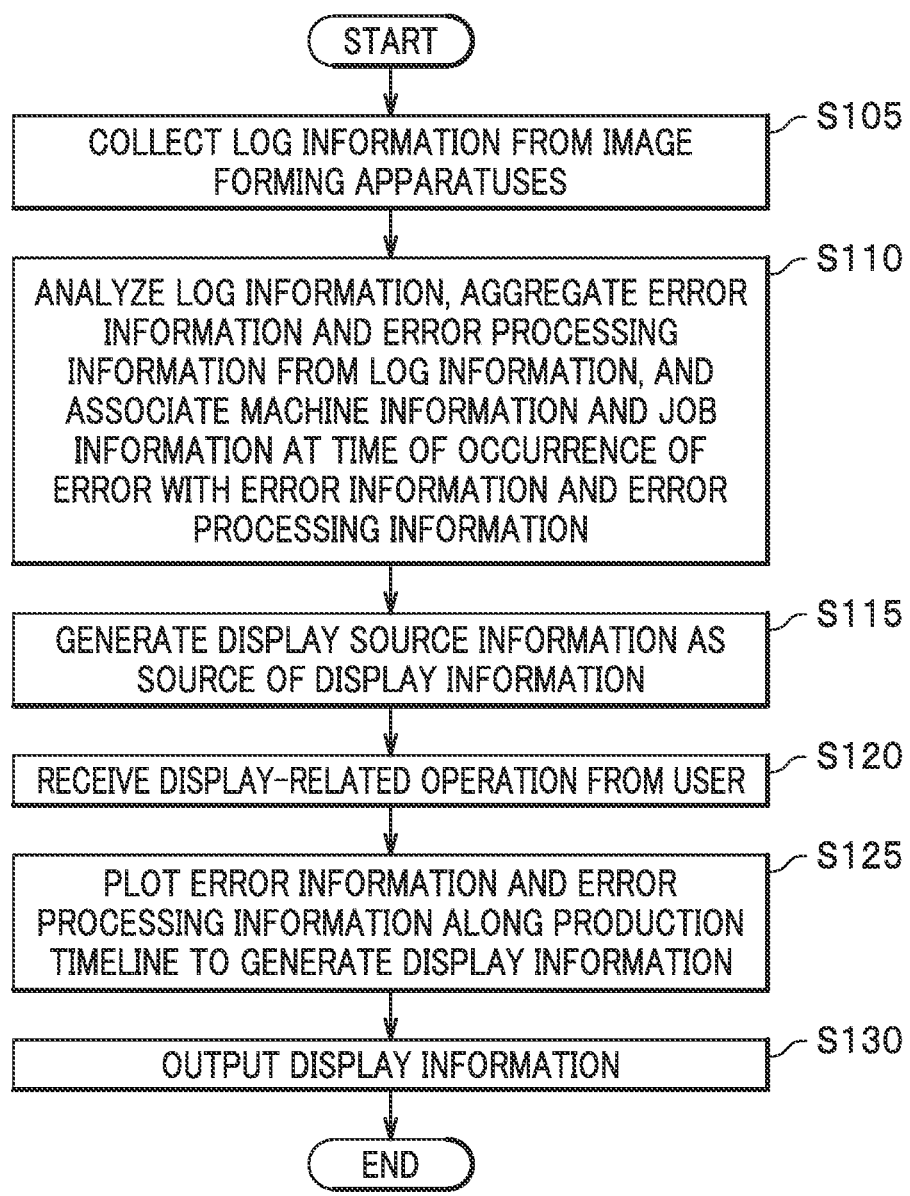
FIG. 3 is a flowchart illustrating an operation example of the management device according to the embodiment.

Hereinafter, operations of the management device 110 will be described with reference to FIG. 3. FIG. 3 is a flowchart illustrating an operation example of the management device 110.

As illustrated in FIG. 3, first, the log acquisition section 11 of the management device 110 collects (step S105) log information (information representing machine states) from the image forming apparatuses 130 via the log collection devices 120 or directly. The management device 110 registers the collected log information in the log database 21.

Next, the log analysis section 12 of the management device 110 analyzes (step S110) the log information of the image forming apparatuses 130 registered in the log database 21, aggregates error information and error processing information from the log information, and associates machine information and job information at the times of occurrences of the errors with the error information and the error processing information. The management device 110 registers the generated display source information (not illustrated) in the processing result database 22.

Next, the information processing section 13 of the management device 110 generates (step S115) display source information (not shown) as the source of the display information 52, 53, 54, and 55 (see FIGS. 5 to 8) based on the error information and the error processing information associated with the machine information and the job information at the times of occurrences of the errors. The management device 110 registers the generated display source information (not illustrated) in the processing result database 22.

After step S115, the input section 14 of the management device 110 receives (step S120) a display-related operation from the user at any time. FIG. 4 illustrates an example of an operation acceptance screen 51 used at this time. The operation acceptance screen 51 is a screen displayed on a display device of a device capable of communicating with the management device 110, such as the image forming apparatus 130, the personal computer 140, and the smartphone 141. Details of the operation acceptance screen 51 will be described later.

Next, the display information generation section 15 of the management device 110 reads the display source information (not illustrated) registered in the processing result database 22 in response to the received operation, and extracts, processes, edits, or composes a part of the display source information (not illustrated). Then, the display information generation section 15 plots the error information and the error processing information along the production timeline 81 to generate the display information 52, 53, 54, and/or 55 (see FIGS. 5 to 8) (step S125). The management device 110 may receive a condition for analysis from the user, and may analyze the log information based on the condition. That is, the process described here is merely an example, and the method of generating the display information 52, 53, 54, and 55 (see FIGS. 5 to 8) from the log information is not limited to the process described here.

Next, the display information output section 16 of the management device 110 outputs (step S130) the display information 52, 53, 54, and/or 55 (see FIGS. 5 to 8) to the outside. The output destination is the image forming apparatus 130, the personal computer 140, the smartphone 141, the display device 110a connected to the management device 110 itself, or the like. The image forming apparatus 130, the personal computer 140, and the smartphone 141 display information 52, 53, 54, or 55 (see FIGS. 5 to 8) on their own display devices.

Exemplary Display Information

Figure 5:
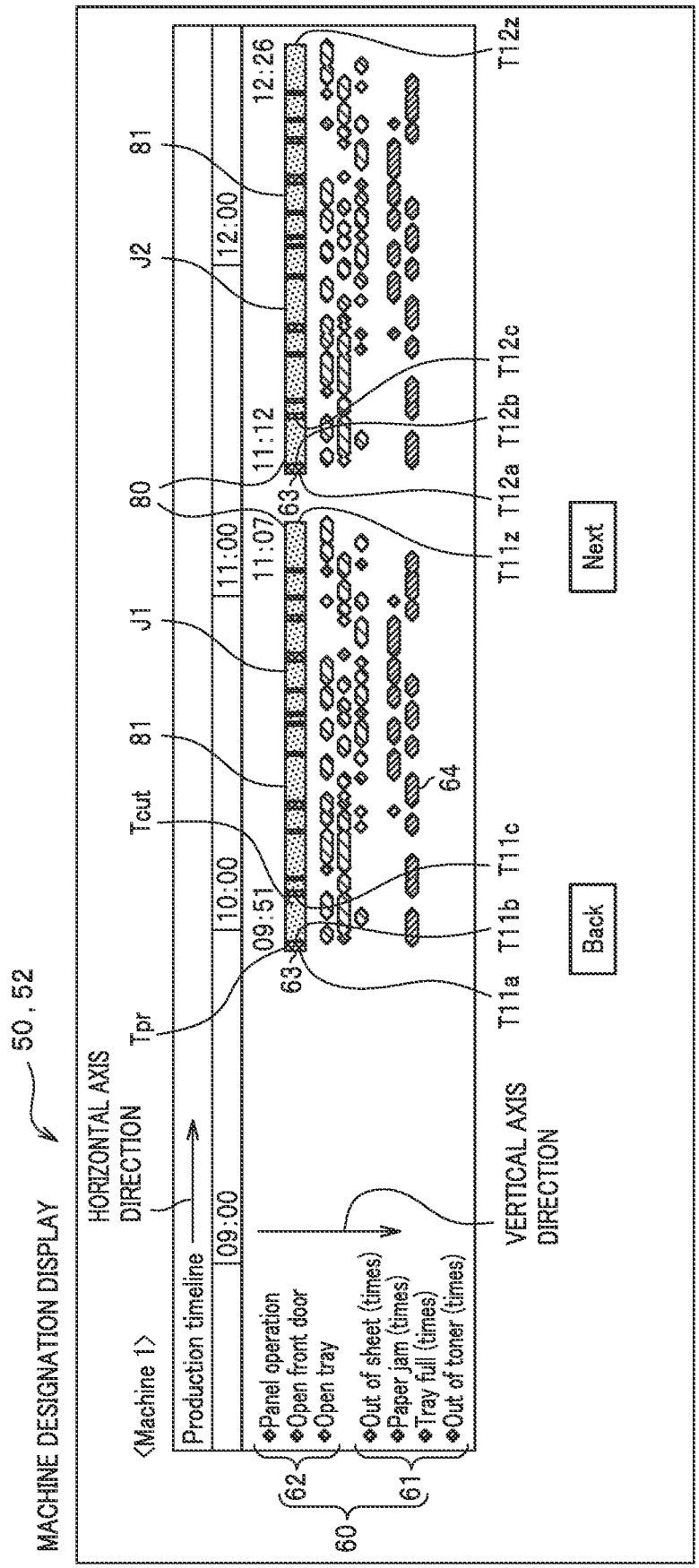
FIG. 5 is an explanatory diagram of display information in a machine designation display mode.
Figure 6:
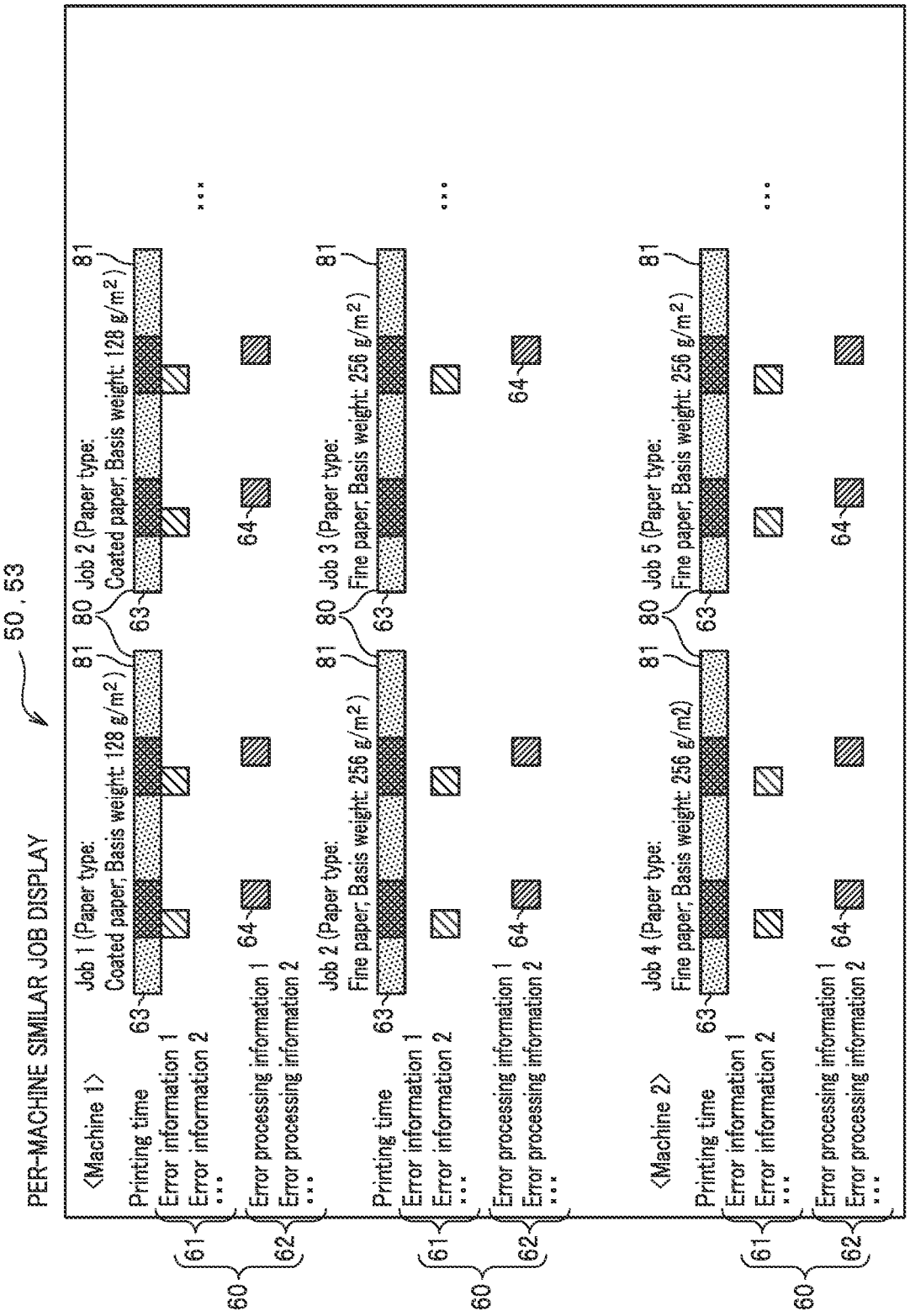
FIG. 6 is an explanatory diagram of display information in a per-machine similar job display mode.
Figure 7:
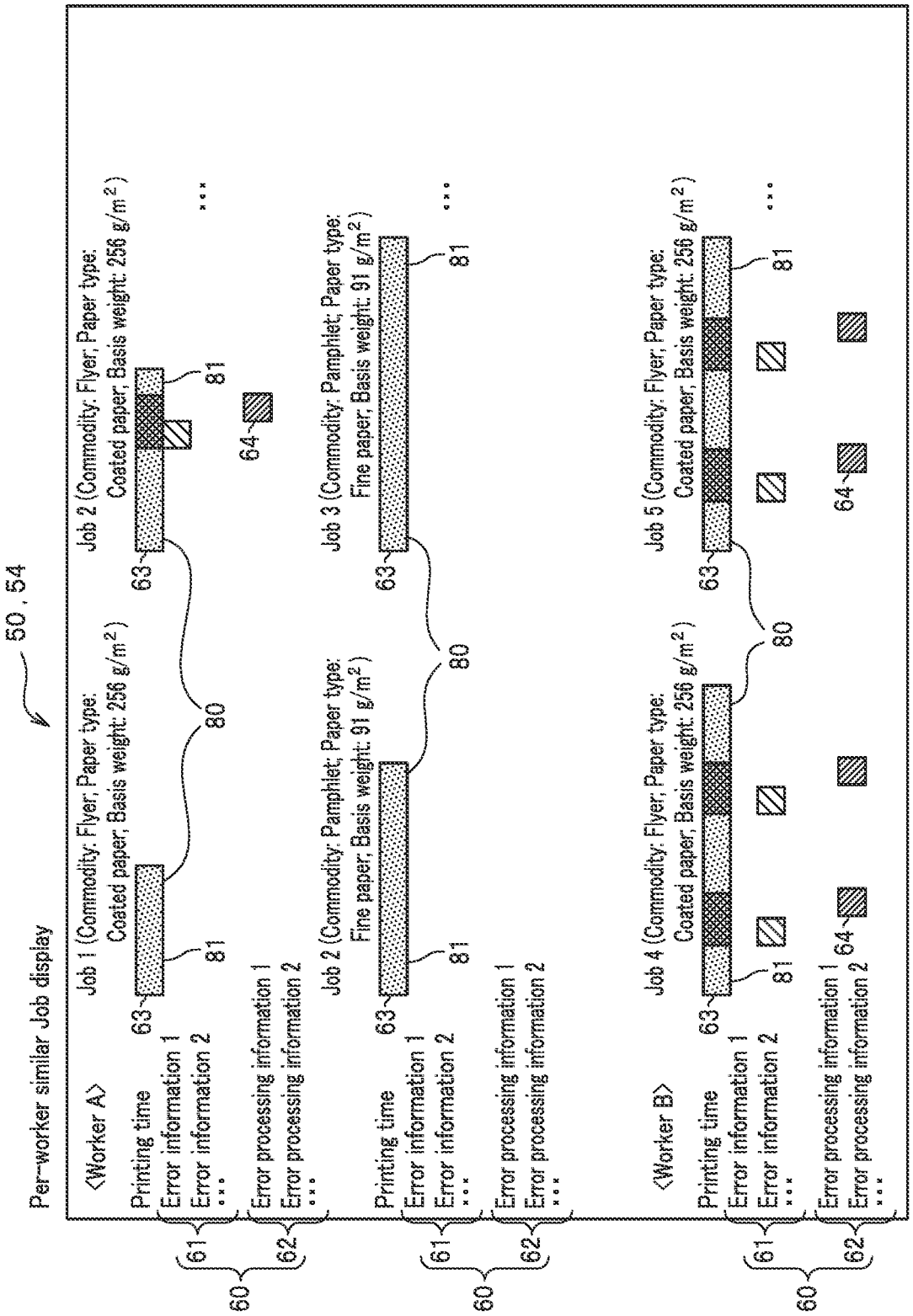
FIG. 7 is an explanatory diagram of display information in a per-worker similar job display mode.

Hereinafter, the display information 52, 53, 54, and 55 generated by the management device 110 will be described with reference to FIGS. 4 to 8. FIG. 4 is an explanatory diagram illustrating an example of the above-described operation acceptance screen 51. FIG. 5 is an explanatory diagram of the display information 52, which is in a machine designation display mode. FIG. 6 is an explanatory diagram of the display information 53, which is in a per-machine similar job display mode. FIG. 7 is an explanatory diagram of the display information 54, which is in a per-worker similar job display mode. FIG. 8 is an explanatory diagram of the display information 55, which is in a per-similar-job machine production record display mode. In the present embodiment, it is assumed that the operation acceptance screen 51 and the display information 52, 53, 54, and 55 are configured to be suitable for monitoring machine troubles during execution of a plurality of image forming (printing) jobs.

Each of the display information 52, 53, 54, and 55 is generated when the management device 110 receives a corresponding user operation input on the operation acceptance screen 51 illustrated in FIG. 4, and is displayed on a display device. In the example illustrated in FIG. 4, the operation acceptance screen 51 is configured to allow the user to select one of: the machine designation display mode, a time designation display mode, a production sheet count designation display mode, the per-machine similar job display mode, the per-worker similar job display mode, and the per-similar-job machine production record display mode.

The machine designation display mode is a mode for designating a machine and displaying information on errors in each job executed by the designated machine (see FIG. 5).

The time designation display mode is a mode in which a time is specified and information on errors in each job executed at the specified time or during a temporal period including the specified time is displayed.

The production sheet count designation display mode is a mode for designating the number of sheets to be produced (the number of printing sheets) and displaying information on errors in each job of producing (printing) the specified number of sheets (or sheets as many as a number equal to or larger than the number of the specified number of sheets).

The per-machine similar job display mode is a mode for displaying information on errors in each similar job on a per machine basis (see FIG. 6).

The per-worker similar job display mode is a mode for displaying information on errors in each similar job on a per worker basis (see FIG. 7).

The per-similar-job machine production record display mode is a mode for displaying information on errors in production records of each machine on a per similar job basis (see FIG. 8).

FIG. 5 illustrates an example of the display information 52 in the machine designation display mode. The display information 52 in the machine designation display mode is displayed such that one or a plurality of items of error-related information 60 of a plurality of jobs executed by a machine designated by a user are displayed side by side. In the example illustrated in FIG. 5, the display information 52 in the machine designation display mode includes production timeline information 80 of a plurality of jobs arranged along the horizontal axis and one or a plurality of items of error-related information 60 are arranged along the vertical axis. It should be noted that other display information 53, 54, and 55 illustrated in FIGS. 6 to 8 have a similar configuration.

The error-related information 60 includes error information 61 and error processing information 62.

The error information 61 represents an interruption factor such as out of sheet, tray full (a state of a sheet ejection tray being full), paper jam, out of toner, or the like. The error information 61 may include any one or more of: an error name such as out of sheer and "paper jam"; an error code of a machine; and an error occurrence location such as "tray 1".

The error processing information 62 represents machine operations such as "panel operation", "open front door", and "open tray" and system operations such as "execution of photoreceptor cleaning" (not shown). The error processing information 62 may include any one or more of information regarding machine operations and information regarding system operations.

In the case of the present embodiment, one or a plurality of items of error-related information 60 are arranged along the vertical axis. More specifically, the error-related information 60 are classified into items of error information 61 and items of error processing information 62.

The production timeline information 80 represents the temporal course of the execution of each job. The production timeline information 80 may include any one or more of: a machine operating time of a machine during which printing is not being performed but a power supply of the machine is turned on; a printing time during which printing is performed; and the number of sheets actually printed. The production timeline information 80 is configured to be presented as production timelines 81 each presenting temporal information in the form of a bar graph, on which production timeline 81 print timing information 63 representing print timing is plotted. The production timeline information 80 may include any one or more of a machine operating time, a printing time, and the number of sheets. In the case of the present embodiment, the production timelines 81 are arranged along the horizontal axis. More specifically, a plurality of production timelines 81 are arranged side by side in the horizontal direction so as to extend in the same direction.

In the example illustrated in FIG. 5, the display information 52 in the machine designation display mode represents: a job J1 in which the print start time T11a is "09:51" (9 o'clock 51 minutes) and the print end time T11z is "11:07" (11 o'clock 7 minutes); and a job J2 in which the print start time T12a is "11:12" (11 o'clock 12 minutes) and the print end time T12z is "12:26" (12 o'clock 26 minutes). The job J1 and the job J2 each include a print execution time Tpr and a print interruption time Tcut. The print execution time Tpr and the print interruption time Tcut are displayed in different colors on the production timeline 81. For example, in the production timeline 81 of the job J1, the time from the print start time T11a to the print interruption start time T11b corresponds to the first print execution time Tpr, and the time from the print interruption start time T11b to the print restart time T11c corresponds to the first print interruption time Tcut. The production timeline 81 of the job J1 represents that the print execution time Tpr and the print interruption time Tcut are repeated. Similarly, in the production timeline 81 of the job J2, the time from the print start time T12a to the print interruption start time T12b corresponds to the first print execution time Tpr, and the time from the print interruption start time T12b to the print restart time T12c corresponds to the first print interruption time Tcut. The production timeline 81 of the job J2 represents that the print execution time Tpr and the print interruption time Tcut are repeated.

The display information 52 in the machine designation display mode includes plots 64 below the production timeline 81 as temporal course information related to the error information 61 and the error processing information 62.

The production timeline information 80 may presents, on each production timeline 81, print timing information together with the plots 64 of the error information 61 and the error processing information 62 with distinctive colors so that it may be easy to understand intuitively how long the machine is stopped due to various errors. Examples of the print timing information include print start time information, print end time information, print interruption start time information, and print restart time information. In the case of the present embodiment, to make the print timing information visually easy to understand, the production timeline information 80 include a bar graph (production timeline 81) representing a first temporal period (first temporal information) from the print start time to the print end time, on which bar graph a second temporal period (second temporal information) from the print interruption start time to the print restart time is presented with a color different from the first temporal period excluding the second temporal period.

FIG. 6 illustrates an example of the display information 53 in the per-machine similar job display mode. The display information 53 in the per-machine similar job display mode includes items of the error-related information 60 arranged for each similar job on a per machine basis.

The user is allowed to select a display method on the operation acceptance screen 51 (see FIG. 4) to cause the display device to display information matching the analysis target of the user. For example, by causing the display device to display the display information 53 in the per-machine similar job display mode illustrated in FIG. 6, the user can display and check the error-related information 60 for each similar job on a per machine basis side by side. With this, the user can easily analyze the error information 61 to identify errors frequently occurring in each machine, and can easily figure out the features of the jobs in which the errors occurred.

FIG. 7 illustrates an example of the display information 54 in the per-worker similar job display mode. The display information 54 in the per-worker similar job display mode includes items of the error-related information 60 arranged for each similar job on a per worker basis.

The user is allowed to cause the display device to display the display information 54 in the per-worker similar job display mode as illustrated in FIG. 7, thereby to check the error-related information 60 for each similar job on a per worker basis. With this, the user can easily figure out the failure time (downtime) due to the difference in the worker and can plan or execute a measure for improving the skill of the worker.

FIG. 8 illustrates an example of the display information 55 in the per-similar-job machine production record display mode. The display information 55 in the per-similar-job machine production record display mode includes items of the error-related information 60 arranged side by side for each machine production record on a per similar job basis.

The user is allowed to cause the display device to display the display information 55 in the per-similar-job machine production record display mode illustrated in FIG. 8, thereby to check the production record information of each machine on a per similar job basis. As a result, the user can select an optimum process with a low error occurrence probability according to the feature of the job.

Figure 9A:
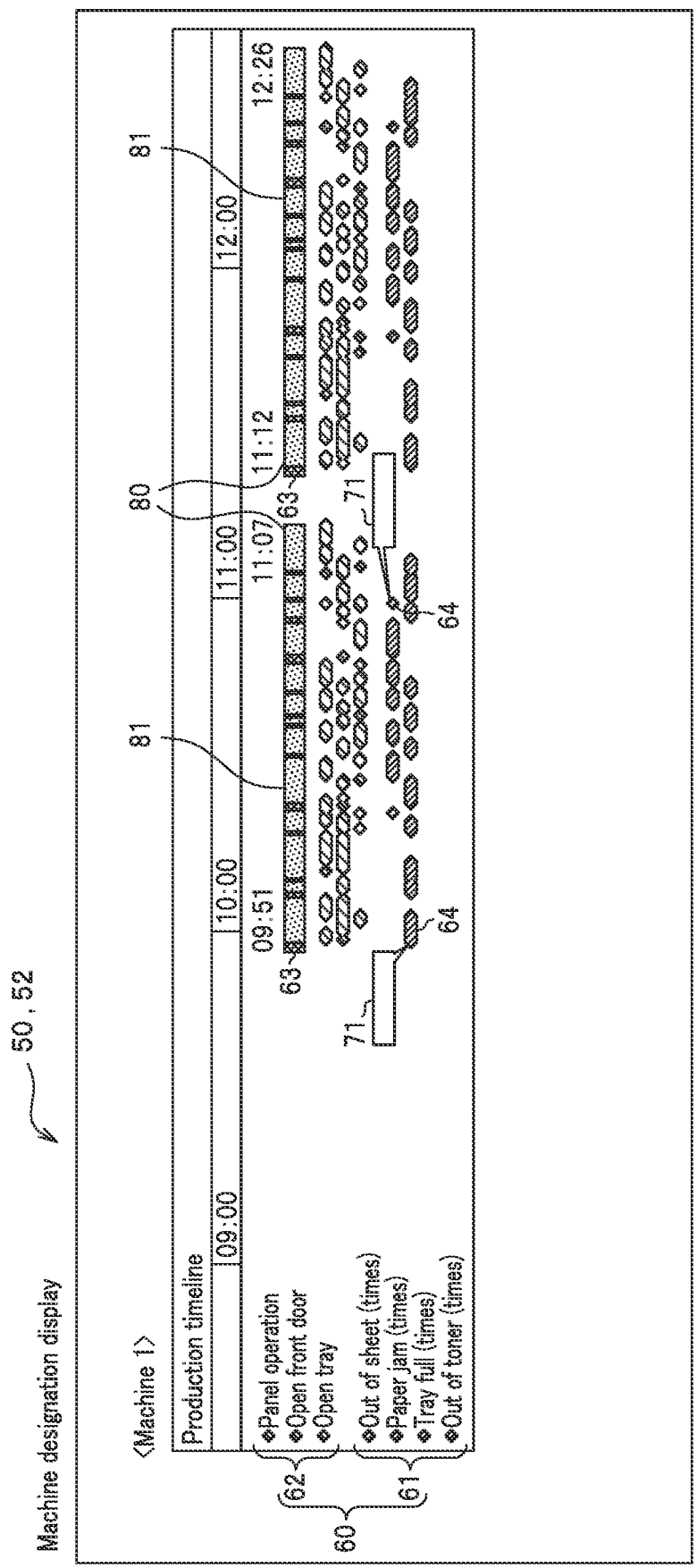
FIG. 9A is an explanatory diagram of error detail information additionally displayed on display information in the machine designation display mode.

Note that each of the display information 52, 53, 54, and 55 (refer to FIGS. 5 to 8) may be configured such that error detail information 71 (see FIGS. 9A and 9B) in which the details of the error are described can be popped up. FIG. 9A is an explanatory diagram of error detail information 71 which is displayed additionally in the display information 52 in the machine designation display mode. FIG. 9B is an explanatory diagram of the error detail information 71.

In the example illustrated in FIG. 9A, error detail information 71 is additionally displayed corresponding to plots 64. The display information 52, 53, 54, and 55 (see FIGS. 5 to 8) is configured to display the error detail information 71 when a cursor is placed on the corresponding displayed plot 64. Further, the display information 52, 53, 54, and 55 (see FIGS. 5 to 8) is configured to display the details of the error detail information 71 as illustrated in FIG. 9B when the cursor is placed on the displayed error detail information 71. In the example illustrated in FIG. 9B, the error detail information 71 includes a name, a code, an occurrence time, machine information, an occurrence location, job information, work content, and a work manual.

As illustrated in FIGS. 9A and 9B, the user can check the details of the error by placing the cursor at any position of the plot 64 to display the error detail information 71 in a pop-up format. The error detail information 71 may include, for example, an error name, an error code, an error occurrence time, an error occurrence location, machine information, job information, and troubleshooting information. Here, the machine information is, for example, information such as a name or a model name of the machine in which the error has occurred. The job information is, for example, information including print specification of a printed matter printed when the error occurred. The troubleshooting information is, for example, work content information for resolving the error, information on a link through which a work manual is retrievable, or the like.

Figure 10:
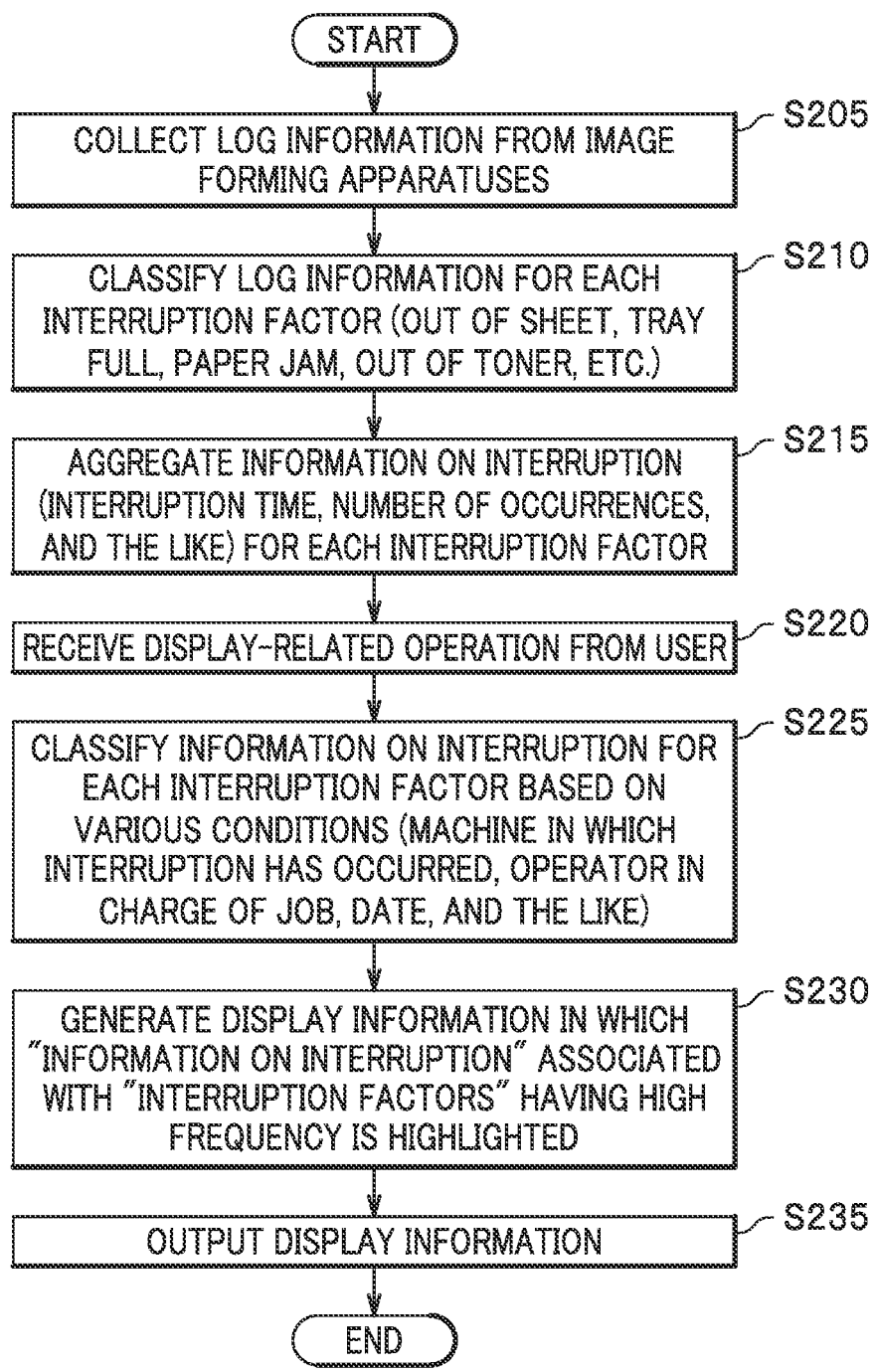
FIG. 10 is a flowchart illustrating an operation example of the management device according to the embodiment when error detail information is generated.

The error detail information 71 illustrated in FIGS. 9A and 9B may be generated by the management device 110 performing the processing illustrated in FIG. 10, for example. FIG. 10 is a flowchart illustrating an operation example of the management device 110 when generating error detail information.

In the example illustrated in FIG. 10, first, the log acquisition section 11 of the management device 110 collects (step S205) log information (information representing machine states) from each image forming apparatus 130 via the corresponding log collection device 120 or directly. The management device 110 registers the collected log information in the log database 21.

Next, the log analysis section 12 of the management device 110 analyzes the log information of the image forming apparatus 130 registered in the log database 21, and classifies (step S210) the log information for each interruption factor (out of sheet, tray full, paper jam, out of toner, etc.). The management device 110 registers the classification result information (not illustrated) in the processing result database 22.

Next, the information processing section 13 of the management device 110 analyzes the classification result information (not illustrated) registered in the processing result database 22, and aggregates (step S215) the information on the interruption (interruption time, number of occurrences, and the like) for each interruption factor. The management device 110 registers the aggregation result information (not illustrated) in the processing result database 22.

After step S215, the input section 14 of the management device 110 accepts (step S220) a display-related operation from the user at any time.

Next, in response to the accepted operation, the display information generation section 15 of the management device 110 reads out the aggregation result information (not illustrated) registered in the processing result database 22, and classifies (step S225) the information on the interruption for each interruption factor based on various conditions (machine in which the interruption has occurred, operator in charge of the job, date, and the like).

Next, the display information generation section 15 of the management device 110 generates (step S230) the display information 52 (see FIG. 9A) to which the error detail information 71 (see FIGS. 9A and 9B) is associated. In this display information 52, information on interruption associated with interruption element(s) with high occurrence frequencies is highlighted.

Next, the display information output section 16 of the management device 110 outputs (step S235) the display information 52 (see FIG. 9A) to which the error detail information 71 (see FIGS. 9A and 9B) is associated to the outside. The output destination is the image forming apparatus 130, the personal computer 140, the smartphone 141, the display device 110a connected to the management device 110 itself, or the like. The image forming apparatus 130, the personal computer 140, or the smartphone 141 display the error detail information 71 (see FIGS. 9A and 9B) on its own display device.

Main Features of Management Device (1) As illustrated in FIG. 2, a management device 110 for managing machine troubles includes a display information generation section 15 and a display information output section 16. The display information generation section 15 generates display information (display information 52, 53, 54, 55) (see FIGS. 5 to 8) in which production timeline information 80 of one or a plurality of jobs and error-related information 60 are associated with each other. The display information output section 16 outputs the display information to the outside. The production timeline information 80 includes one or a plurality of pieces of production timeline information of the one or a plurality of jobs. The error-related information 60 includes one or a plurality of pieces of error-related information each associated with a corresponding one of the one or a plurality of pieces of production timeline information. In the display information (see FIGS. 5 to 8), the one or a plurality of pieces of production timeline information are arranged along one of a vertical axis and a horizontal axis and the one or a plurality of pieces of error-related information are arranged along the other axis.

The management device 110 according to the above-described present embodiment generates the display information 52, 53, 54, 55 (see FIGS. 5 to 8) and displays the information on a display device. In each of the display information 52, 53, 54, and 55 (see FIGS. 5 to 8), the one or a plurality of pieces of production timeline information of the one or a plurality of jobs are arranged along one of the vertical axis and the horizontal axis and the one or a plurality of pieces of error-related information are arranged along the other axis. The management device 110 according to the above-described present embodiment facilitates identification of a process that is a bottleneck (obstacle) in job execution in association with the production timelines of a plurality of jobs.

(2) In the display information (display information 52, 53, 54, and 55) (see FIGS. 5 to 8), each of the one or a plurality of pieces of error-related information may include information indicative of occurrence timing of a corresponding error and information indicative of end timing of the corresponding error, and the occurrence timing and the end timing of each of the one or a plurality of pieces of error-related information may be arranged (plotted) along the corresponding one of the one or a plurality of pieces of production timeline information.

The management device 110 according to the present embodiment generates the above-described display information 52, 53, 54, and 55 as illustrated in FIGS. 5 to 8. The above-described display information 52, 53, 54, and 55 are each configured such that it is possible to understand at a glance which malfunction occurs how often in a plurality of jobs. Therefore, the management device 110 according to the present embodiment facilitates identification of a process that is a bottleneck (obstacle) in job execution in association with the production timelines of a plurality of jobs.

(3) The error-related information 60 may include error information 61 including any one or more of an error name, an error code, or an error occurrence location.

The management device 110 according to the above-described present embodiment can present information such as an error name, an error code, and an error occurrence location as the error information 61 to the user. Therefore, the management device 110 according to the present embodiment makes it easier to analyze what kind of error occurs.

(4) The error-related information 60 may include error processing information 62. The error processing information 62 may include any one or more of information regarding machine operations and information regarding system operations.

The management device 110 according to the above-described present embodiment can present information such as information regarding machine operations and information regarding system operations to the user as the error processing information 62. Therefore, the management device 110 according to the present embodiment makes it easier to analyze what kind of error processing has been performed.

(5) The production timeline information 80 may include any one or more of a machine operating time, a printing time, and the number of sheets.

The management device 110 according to the above-described present embodiment can present information such as a machine operating time, a printing time, and the number of sheets to the user as the production timeline information 80. Therefore, the management device 110 according to the present embodiment makes it easier to analyze at what timing an error occurs.

(6) As illustrated in FIG. 2, the error-related information 60 may include error information 61, error processing information 62, and print timing information 63. The print timing information 63 may be plotted on production timelines 81 included in the production timeline information 80.

The management device 110 according to the above-described present embodiment can present the print timing information 63 to the user in an easy-to-understand manner.

(7) The display information generation section 15 may generate the display information (display information 52, 53, 54, 55) so as to include a bar graph (production timeline 81) representing first temporal information from the print start time to the print end time, on which bar graph second temporal information from the print interruption start time to the print restart time is represented with a color different from the first temporal information excluding the second temporal information.

The management device 110 according to the present embodiment displays machine error information (malfunction and the like) and error processing information (trouble solving work and the like) of a plurality of jobs with different colors along the bar graph (production timeline 81). The display information is configured so that it is possible to understand at a glance which malfunction occurs how often in a plurality of jobs. Therefore, the management device 110 according to the present embodiment facilitates identification of a process that is a bottleneck (obstacle) in job execution in association with the production timelines of a plurality of jobs.

(8) The display information may be configured such that the display unit of the display information may be switched to display one of the display information 52, 53, 54, and 55 according to the user's operation on the operation acceptance screen 51 illustrated in FIG. 4.

The management device 110 according to the present embodiment is capable of generating the display information 52, 53, 54, and 55 as illustrated in FIGS. 5 to 8. The above-described display information 52, 53, 54, and 55 each represent a process(es) in which errors frequently occur continuously in association with the production timelines of a plurality of jobs. Moreover, the above-described display information is configured such that a display unit of the display information may be switched to display one of the display information 52, 53, 54, and 55 according to an operation of the user. That is, the management device 110 according to the present embodiment allows the user to switch the display unit so that the user can easily figure out a process in which errors frequently occur continuously in association with the production timelines of a plurality of jobs.

(9) As illustrated in FIG. 6, the display information 53 may be configured to display similar jobs side by side on a per machine basis.

The management device 110 according to the present embodiment can generate the above-described display information 53. The above-described display information 53 is configured to display similar jobs side by side on a per machine basis. Based on this information, the management device 110 according to the present embodiment arranges and displays similar jobs side by side on a per machine basis. This makes it possible to figure out a process in which errors frequently occur continuously in association with the production timelines of a plurality of jobs.

(10) As illustrated in FIG. 6, the display information 53 may be configured to classify and display similar jobs according to the job feature, on a per machine basis. That is, the display information 53 has a configuration in which, for each machine, similar jobs are classified and arranged according to the job feature.

The management device 110 according to the present embodiment can generate the above-described display information 53. The above-described display information 53 is configured to classify and display similar jobs according to the job feature, on a per-machine basis. Based on this information, the management device 110 according to the present embodiment classifies and displays similar jobs according to the job feature even for the same machine. This makes it possible to figure out a process in which errors frequently occur continuously in association with the production timelines of a plurality of jobs.

(11) As illustrated in FIG. 7, the display information 54 may be configured to display similar jobs side by side on a per production worker basis.

The management device 110 according to the present embodiment can generate the above-described display information 54. The above-described display information 54 is configured to display similar jobs side by side on a per production worker basis. Based on this information, the management device 110 according to the present embodiment displays similar jobs side by side on a per production worker basis. This makes it possible to figure out a process in which errors frequently occur continuously in association with the production timelines of a plurality of jobs.

(12) As illustrated in FIG. 7, the display information 54 may be configured to classify and display similar jobs according to the job feature, on a per production worker basis. That is, the display information 54 has a configuration in which, for each production worker, similar jobs are classified and arranged according to the job feature.

The management device 110 according to the present embodiment can generate the above-described display information 54. The above-described display information 54 is configured to classify and display similar jobs according to the job feature, on a per production worker basis. Based on this information, the management device 110 according to the present embodiment classifies and displays similar jobs according to the job feature even for the same production worker. As a result, the management device 110 according to the present embodiment makes it easier to analyze what kind of job feature is the occurrence factor of an error in a plurality of similar jobs.

(13) As illustrated in FIG. 8, the display information 55 may be configured to display production records of machines on a per similar job basis.

The management device 110 according to the present embodiment can generate the above-described display information 55. The above-described display information 55 is configured to display production records of machines on a per similar job basis. Based on this information, the management device 110 according to the present embodiment displays the production records of the machines on a per similar job basis. As a result, the management device 110 according to the present embodiment makes it easier to analyze what kind of error will occur due to an excessive production record.

(14) As illustrated in FIG. 6, the display information 53 may be configured to display the production records separately for each of the machines on a per similar job basis.

The management device 110 according to the present embodiment can generate the above-described display information 53. The above-described display information 53 is configured to display production records of machines separately for each of the machines on a per similar job basis. Based on this information, the management device 110 according to the present embodiment displays similar jobs separately for each machine even for the same similar job. This makes it possible to easily figure out a process in which errors frequently occur continuously in association with the production timelines of a plurality of jobs.

(15) As illustrated in FIG. 9A, the display information 52 may be configured such that when a cursor is placed on a displayed plot 64, error detail information 71 is displayed. The same applies to the other display information 53, 54, and 55.

The management device 110 according to the present embodiment can generate the above-described display information 52. The above-described display information 52 is configured such that when a cursor is placed on a displayed plot 64, error detail information 71 is displayed. With this, the management device 110 according to the present embodiment displays the error detail information 71 via the above-described display information 52, to present details of the error to the user. This makes it easier to analyze what kind of error would occur.

(16) The error detail information 71 may include any one or more of error occurrence time information, error occurrence location information, machine information, job information, and troubleshooting information.

The management device 110 according to the present embodiment can present information such as error occurrence time information, an error occurrence location, machine information, job information, and troubleshooting information to the user as the error detail information 71. As a result, the management device 110 according to the present embodiment makes it easier to analyze the occurrence factor of an error, troubleshooting, and the like.

(17) A recording medium according to the present embodiment may be a recording medium that stores a computer program for causing a computer to function as the management device 110, which manages machine troubles. The above-described program (web application 29) is a computer program for causing the computer to function as the display information generation section 15 and the display information output section 16. The display information generation section 15 is a constituent element that generates display information (display information 52, 53, 54, 55) in which production timeline information 80 of one or a plurality of jobs are arranged along any one of the vertical axis and the horizontal axis and one or a plurality of items of error-related information 60 are arranged on the other axis. The display information output section 16 is a constituent element that outputs the display information to the outside.

Such a recording medium according to the present embodiment can embody the management device 110 by the computer program (web application 29).

(18) A management method according to the present embodiment is a management method for managing machine troubles and includes a display information generation step (step S125 in FIG. 3) and a display information output step (step S130 in FIG. 3). The display information generation step (step S125 in FIG. 3) is a step of generating display information (display information 52, 53, 54, 55) in which production timeline information 80 of one or a plurality of jobs is arranged along one of the vertical axis and the horizontal axis and one or a plurality of items of error-related information 60 are arranged on the other axis. The display information output step (step S130 in FIG. 3) is a step of outputting the display information to the outside.

The management method according to the present embodiment generates the above-described display information 52, 53, 54, and 55 (see FIGS. 5 to 8) and displays them on the display device. The display information 52, 53, 54, and 55 (see FIGS. 5 to 8) are each configured such that one or a plurality of items of error-related information 60 are displayed corresponding to one of the vertical axis and the horizontal axis, and production timeline information 80 of a plurality of jobs is displayed corresponding to the other axis. Therefore, the management method according to the present embodiment facilitates identification of a process that is a bottleneck (obstacle) in job execution in association with the production timelines of a plurality of jobs.

(19) An image forming system 100 according to the present embodiment includes image forming apparatuses and a management device 110, which manages machine troubles of the image forming apparatuses. The management device 110 includes a display information generation section 15 and a display information output section 16. The display information generation section 15 is a constituent element that generates display information (display information 52, 53, 54, and 55) in which one or a plurality of items of error-related information 60 of the image forming apparatuses are displayed with respect to any one of the vertical axis and the horizontal axis and production timeline information 80 of one or a plurality of jobs of the of image forming apparatuses are displayed with respect to the other axis. The display information output section 16 is a constituent element that outputs the display information to the outside.

The image forming system 100 according to the present embodiment generates the display information 52, 53, 54, and 55 (see FIGS. 5 to 8) and displays the display information on a display device. The display information 52, 53, 54, and 55 (see FIGS. 5 to 8) is configured such that one or a plurality of items of error-related information 60 are displayed corresponding to one of the vertical axis and the horizontal axis, and production timeline information 80 of a plurality of jobs are displayed corresponding to the other axis. Therefore, the image forming system 100 according to the present embodiment can facilitate identification of a process that is a bottleneck (obstacle) in job execution in association with the production timelines of a plurality of jobs.

As described above, the management device 110 according to the present embodiment generates the above-described display information 52, 53, 54, and 55 (see FIGS. 5 to 8) and displays the generated information on the display device. The display information 52, 53, 54, and 55 (see FIGS. 5 to 8) are each configured such that the one or a plurality of items of the error-related information 60 are displayed corresponding to one of the vertical axis and the horizontal axis and the production timeline information 80 of the plurality of jobs are displayed corresponding to the other axis. Therefore, the management device 110 of the present embodiment makes it easier to identify a process that is a bottleneck (failure) of job execution in association with the production timelines of a plurality of jobs.

Although embodiments of the present invention have been described and illustrated in detail, the disclosed embodiments are made for purposes of illustration and example only and not limitation. The scope of the present invention should be interpreted by the terms of the appended claims.

It should be further noted that the present invention is not limited to the above-described embodiments, and various changes and modifications can be made without departing from the scope of the present invention.

For example, the above-described embodiment has been described in detail in order to clearly describe the gist of the present invention. Therefore, the present invention is not necessarily limited to one including all the constituent elements described above. Further, in the present invention, other constituent elements can be added to certain constituent elements, or some constituent elements can be changed to other constituent elements. In addition, in the present invention, some constituent elements can be deleted.

In the embodiment, the image forming apparatus 130 and the management device 110 are configured as separate apparatuses. However, the image forming apparatus 130 may have the function of the management device 110 to play the role of the management device 110. In that case, the display information output section 16 outputs the display information to the display device 131*a* included in the image forming apparatus 130. It should be further noted that a specific image forming apparatus 130 may collect and analyze the log information of the other image forming apparatuses 130 and output the display information to the other image forming apparatuses 130.

What is claimed is:

1. A management device for managing machine troubles, the management device comprising a controller implemented using one or more hardware processors, wherein the controller:
   generates display information in which production timeline information of one or a plurality of jobs and information on errors of the one or the plurality of jobs are associated with each other; and
   outputs the display information,
      wherein the production timeline information comprises one or a plurality of pieces of production timeline information of the one or the plurality of jobs,
      wherein the information on errors comprises one or a plurality of pieces of error-related information each associated with a corresponding one of the one or the plurality of pieces of production timeline information,
      wherein in the display information, the one or the plurality of pieces of production timeline information are arranged along one of a vertical axis and a horizontal axis and the one or the plurality of pieces of error-related information are arranged along an other of the vertical axis and the horizontal axis, and
      wherein each of the one or the plurality of pieces of error-related information comprises error information comprising any one or more of an error name, an error code, and an error occurrence location.

2. The management device according to claim 1,
wherein the each of the one or the plurality of pieces of error-related information further comprises information indicative of occurrence timing of a corresponding error and information indicative of end timing of the corresponding error, and
wherein in the display information, the occurrence timing and the end timing of the each of the one or the plurality of pieces of error-related information are arranged along the corresponding one of the one or the plurality of pieces of production timeline information.

3. The management device according to claim 1,
wherein the each of the one or the plurality of pieces of error-related information further comprises error processing information comprising any one or more of information regarding machine operations and information regarding system operations.

4. The management device according to claim 1,
wherein each of the one or the plurality of pieces of production timeline information comprises any one or more of a machine operating time, a printing time, and a number of sheets.

5. The management device according to claim 1,
wherein the each of the one or the plurality of pieces of error-related information comprises the error information, error processing information, and print timing information, and
wherein the print timing information is plotted on a production timeline included in a corresponding one of the one or the plurality of pieces of production timeline information.

6. The management device according to claim 5,
wherein the display information comprises a bar graph representing first temporal information from a print start time to a print end time, on which bar graph second temporal information from a print interruption start time to a print restart time is represented with a color different from a color of the first temporal information excluding the second temporal information.

7. The management device according to claim 1,
wherein the display information is configured such that a display unit is switched according to an operation of a user.

8. The management device according to claim 1,
wherein the display information is configured to display similar jobs side by side on a per machine basis.

9. The management device according to claim 8,
wherein the display information is configured to classify and display the similar jobs according to a job feature, on a per machine basis.

10. The management device according to claim 1,
where the display information is configured to display similar jobs side by side on a per production worker basis.

11. The management device according to claim 10,
wherein the display information is configured to classify and display the similar jobs according to a job feature, on a per production worker basis.

12. The management device according to claim 1,
wherein the display information is configured to display production records of machines on a per similar job basis.

13. The management device according to claim 12,
wherein the display information is configured to display the production records separately for each of the machines, on a per similar job basis.

14. The management device according to claim 1,
wherein the display information is configured such that when a cursor is placed on a displayed plot, error detail information is displayed.

15. The management device according to claim 14,
wherein the error detail information comprises any one or more of error occurrence time information, error occurrence location information, machine information, job information, and troubleshooting information.

16. A non-transitory computer-readable recording medium storing a computer program for a computer comprising one or more hardware processors, the program causing the computer to function as a machine trouble management device comprising:
a controller implemented using one or more hardware processors, wherein the controller:
generates display information comprising one or a plurality of pieces of production timeline information of one or a plurality of jobs and one or a plurality of pieces of error-related information, the one or the plurality of pieces of production timeline information arranged along one of a vertical axis and a horizontal axis, the one or the plurality of pieces of error-related information arranged along an other of the vertical axis and the horizontal axis, and wherein each of the one or the plurality of pieces of error-related information comprises error information comprising any one or more of an error name, an error code, and an error occurrence location, and
outputs the display information.

17. A management method for managing machine troubles using a management device comprising one or more hardware processors, the method comprising steps of:
generating, by one or more of the one or more hardware processors, display information comprising one or a plurality of pieces of production timeline information of one or a plurality of jobs and one or a plurality of pieces of error-related information, the one or the plurality of pieces of production timeline information arranged along one of a vertical axis and a horizontal axis, the one or the plurality of pieces of error-related information arranged along an other of the vertical axis and the horizontal axis, and wherein each of the one or the plurality of pieces of error-related information comprises error information comprising any one or more of an error name, an error code, and an error occurrence location; and
outputting, by one or more of the one or more hardware processors, the display information to outside.

18. An image forming system comprising:
one or a plurality of image forming apparatuses; and
a management device implemented using one or more hardware processor to manage one or a plurality of machine troubles of the one or the plurality of image forming apparatuses,
wherein the management device:
generates display information in which production timeline information of one or a plurality of jobs and information on errors of the one or the plurality of jobs are associated with each other; and
outputs the display information,
wherein the production timeline information comprises one or a plurality of pieces of production timeline information of the one or the plurality of jobs,
wherein the information on errors comprises one or a plurality of pieces of error-related information each associated with a corresponding one of the one or the plurality of pieces of production timeline information,
wherein in the display information, the one or the plurality of pieces of production timeline information are arranged along one of a vertical axis and a horizontal axis and the one or the plurality of pieces of error-related information are arranged along an other of the vertical axis and the horizontal axis, and
wherein each of the one or the plurality of pieces of error-related information comprises error information comprising any one or more of an error name, an error code, and an error occurrence location.

19. The management device according to claim 1,
wherein the each of the one or the plurality of pieces of error-related information includes one or more plots below the production timeline as temporal course information related to the error information.

20. The management device according to claim 3,
wherein the each of the one or the plurality of pieces of error-related information includes one or more plots below the production timeline as temporal course information related to the error information and the error processing information.

\* \* \* \* \*